US008726641B2

(12) United States Patent
Zanetti et al.

(10) Patent No.: US 8,726,641 B2
(45) Date of Patent: May 20, 2014

(54) METHOD FOR CONTROLLING INJECTION OF DIESEL EXHAUST FLUID INTO AN EXHAUST PIPE OF AN INTERNAL COMBUSTION ENGINE

(75) Inventors: Igor Zanetti, Verrayes (IT); Emiliano Santillo, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 273 days.

(21) Appl. No.: 13/100,971

(22) Filed: May 4, 2011

(65) Prior Publication Data
US 2011/0283678 A1 Nov. 24, 2011

(30) Foreign Application Priority Data
May 19, 2010 (GB) .................................. 1008343.4

(51) Int. Cl.
*F01N 3/00* (2006.01)
*F01N 3/20* (2006.01)

(52) U.S. Cl.
CPC ............ *F01N 3/208* (2013.01); *F01N 2560/026* (2013.01); *F01N 2610/02* (2013.01)
USPC ..................... 60/286; 60/274; 60/297; 60/303

(58) Field of Classification Search
CPC .............. F01N 3/208; F01N 2560/026; F01N 2560/07; F01N 2610/00; F01N 2610/02
USPC .................... 60/274, 286, 295, 297, 303, 311
See application file for complete search history.

(56) References Cited

U.S. PATENT DOCUMENTS

| | | | |
|---|---|---|---|
| 6,216,451 B1 * | 4/2001 | Schnaibel et al. .............. | 60/277 |
| 6,516,607 B1 | 2/2003 | Brueck et al. | |
| 7,418,957 B2 * | 9/2008 | Abe ................................ | 123/697 |
| 7,546,728 B2 * | 6/2009 | Ripper et al. .................... | 60/286 |
| 7,594,392 B2 * | 9/2009 | Wang et al. ...................... | 60/285 |
| 7,690,193 B2 * | 4/2010 | Wickert et al. .................. | 60/286 |
| 7,757,478 B2 * | 7/2010 | Wang et al. ...................... | 60/286 |
| 7,886,523 B1 * | 2/2011 | Legare ............................. | 60/285 |
| 7,971,426 B2 * | 7/2011 | Van Nieuwstadt .............. | 60/277 |
| 8,024,921 B2 * | 9/2011 | Walz et al. ....................... | 60/286 |
| 8,347,624 B2 * | 1/2013 | Pursifull et al. ................. | 60/598 |
| 2004/0098968 A1 | 5/2004 | van Nieuwstadt et al. | |
| 2008/0202104 A1 | 8/2008 | Ichikawa | |
| 2009/0293459 A1 | 12/2009 | Shimomura et al. | |

FOREIGN PATENT DOCUMENTS

DE 3721572 A1 2/1988

OTHER PUBLICATIONS

British Patent Office, British Search Report for British Application No. 1008343.4, dated Aug. 27, 2010.

* cited by examiner

*Primary Examiner* — Binh Q Tran

(74) *Attorney, Agent, or Firm* — Ingrassia Fisher & Lorenz, P.C.

(57) ABSTRACT

A method is provided for controlling injection of Diesel Exhaust Fluid into an exhaust pipe of an internal combustion engine equipped with a Selective Reduction Catalyst. The method includes, but is not limited to monitoring a value of a control parameter influencing an operation of the Selective Reduction Catalyst, injecting a quantity of Diesel Exhaust Fluid, controlling the quantity of Diesel Exhaust Fluid to be injected employing a closed loop procedure or an open loop procedure, switching between the closed loop procedure and the open loop procedure, when value of the control parameter crosses a first threshold value of the control parameter.

33 Claims, 3 Drawing Sheets

METHOD FOR CONTROLLING INJECTION OF DIESEL EXHAUST FLUID INTO AN EXHAUST PIPE OF AN INTERNAL COMBUSTION ENGINE

CROSS-REFERENCE TO RELATED APPLICATION

This application claims priority to British Patent Application No. 1008343.4, filed May 19, 2010, which is incorporated herein by reference in its entirety.

TECHNICAL FIELD

The technical field relates to a method for controlling injection of Diesel Exhaust Fluid (DEF) into an exhaust pipe of an internal combustion engine, typically a Diesel engine.

BACKGROUND

A Diesel engine is conventionally equipped with an aftertreatment system that comprises an exhaust pipe, for leading the exhaust gas from the engine to the environment, and a plurality of aftertreatment devices located in the exhaust pipe, for degrading and/or removing pollutants from the exhaust gas before discharging it into the environment. In greater details, a conventional aftertreatment system generally comprises a Diesel Oxidation Catalyst (DOC), for oxidizing hydrocarbon (HC) and carbon monoxides (CO) into carbon dioxide ($CO_2$) and water ($H_2O$), and a Diesel Particulate Filter (DPF), located in the exhaust pipe downstream the DOC, for removing diesel particulate matter or soot from the exhaust gas.

In order to reduce NOx emissions, most aftertreatment systems further comprise a Selective Reduction Catalyst (SCR), which is located in the exhaust pipe downstream the DPF. The SCR is a catalytic device in which the nitrogen oxides (NOx) contained in the exhaust gas are converted into diatonic nitrogen ($N_2$) and water (H2O), with the aid of a gaseous reducing agent, typically ammonia ($NH_3$), that is stored inside the catalyst. The ammonia is obtained through thermo-hydrolysis of a Diesel Exhaust Fluid (DEF), typically urea ($CH_4N_2O$), which is injected into the exhaust pipe through a dedicated injector located between the DPF and the SCR. The injection of DEF is controlled by an engine control unit (ECU) that determines the quantity of DEF to be injected in the exhaust pipe, in order to achieve an adequate NOx conversion rate inside the SCR, and then commands the injector accordingly.

Some ECU controls the DEF quantity to be injected according to a closed loop procedure, which is focused on the level of NH3 stored inside the SCR. In greater detail, this closed loop procedure provides for determining an index expressive of the $NH_3$ storage level within the SCR, for determining a setpoint of said index, on the basis of the NOx concentration in the exhaust gas and of the exhaust gas temperature upstream the SCR, and for regulating the DEF quantity to be injected so as to minimize the difference between the index and the setpoint associated thereto. While getting an optimal NOx conversion efficiency of the SCR, this closed loop procedure sometimes involves an excessive DEF consumption, especially when the engine operates under heavy conditions, including operating conditions, such as for example high engine load and high engine speed, and environmental conditions, such as for example high environmental temperature or high altitude, i.e. low environmental pressure. Other ECU controls the DEF quantity to be injected according to an open loop procedure, which generally provides for calculating the DEF quantity as a function of the NOx concentration in the exhaust gas upstream the SCR. This open loop procedure normally gets an optimal DEF consumption but reduces the NOx conversion efficiency of the SCR.

In view of the above, at least one object is to optimize both NOx conversion efficiency and DEF consumption in every operating and environmental conditions, or at least in most of them. At least another object is to reach the above mentioned goal with a simple, rational and rather inexpensive solution. In addition, other objects, desirable features and characteristics will become apparent from the subsequent summary and detailed description, and the appended claims, taken in conjunction with the accompanying drawings and this background.

SUMMARY

An embodiment provides a method for controlling injection of Diesel Exhaust Fluid into an exhaust pipe of an internal combustion engine equipped with a Selective Reduction Catalyst, comprising the steps of monitoring a value of a control parameter influencing an operation of the Selective Reduction Catalyst, injecting a quantity of Diesel Exhaust Fluid, controlling the quantity (QDEF) of Diesel Exhaust Fluid to be injected employing a closed loop procedure or an open loop procedure, switching between the closed loop procedure and the open loop procedure, when the monitored value of the control parameter crosses a first threshold value of the control parameter.

As a matter of fact, the switching between the closed loop procedure and the open loop procedure can occur when the monitored value of the control parameter exceeds its first threshold and/or when the monitored value of the control parameter decreases below its first threshold, depending on the specific control parameter. The first threshold value can also be an extreme values of a range of values, so that the switching between the closed loop procedure and the open loop procedure can occur when the control parameter go inside and/or outside said range of values. Moreover, the controlling method can provide for monitor a plurality of different control parameters that influences the operation of the SCR, and for switching between the closed loop procedure and the open loop procedure, when the monitored value of at least one of these control parameters crosses a first threshold value associated thereto. In each case, by selectively using both the closed loop procedure and the open loop procedure, the controlling method globally improves NOx conversion efficiency of the SCR and reduces the DEF consumption, improving mileage range covered by the engine with a full tank of DEF and then the customer satisfaction.

According to an embodiment, each control parameter can be chosen from an operating parameter related to an operation of the internal combustion engine and an environmental parameter related to an environmental condition under which the internal combustion engine operates. Examples of operating parameter are the exhaust gas flow rate upstream the SCR, the exhaust gas temperature upstream the SCR, the NOx concentration in the exhaust gas upstream the SCR and the engine coolant temperature, engine speed and engine load. Examples of environmental parameter are the environmental pressure and the environmental temperature. In this way, the closed loop procedure can be advantageously implemented when the engine operates under standard operating and environmental conditions, in order to achieve an optimal conversion efficiency of the SCR; while the open loop procedure can be advantageously implemented when the engine operates under operating or environmental conditions out of their standard bounds, in order to achieve an optimal DEF consumption.

In greater detail, an embodiment provides that the control parameter is the exhaust gas flow rate upstream the SCR, and that a step of switching from the closed loop procedure to the open loop procedure is performed when the monitored value of this exhaust gas flow rate exceeds a first threshold value of this exhaust gas flow rate. Another embodiment provides that the control parameter is the exhaust gas temperature upstream the SCR, and that a step of switching from the closed loop procedure to the open loop procedure is performed when the monitored value of this exhaust gas temperature exceeds a first threshold value of this exhaust gas temperature. Each of these two embodiments has the advantage of reducing the DEF consumption when the Diesel engine is working to generate high torque, for example when a vehicle equipped with this Diesel engine is pulling a trailer in full load.

According to another embodiment, the control parameter is a NOx quantity in the exhaust gas upstream the SCR, and a step of switching from the closed loop procedure to the open loop procedure is performed when the monitored value of this NOx quantity exceeds a first threshold value of this NOx quantity. The NOx quantity can be expressed in term of NOx concentration or NOx flow rate. This embodiment has the advantage of reducing the DEF consumption when the operation of Diesel engine produces high NOx emissions, which cannot be even reduced with the aid of an exhaust gas recirculation system (EGR).

Still another embodiment provides that the control parameter is an engine coolant temperature, and that a step of switching from the closed loop procedure to the open loop procedure is performed when the monitored value of the engine coolant temperature exceeds a first threshold value of the engine coolant temperature. This embodiment has the advantage of reducing the DEF consumption when the Diesel engine operates under hot environmental temperature.

According to a further embodiment, the control parameter is an engine load, and a step of switching between the closed loop procedure to the open loop procedure is performed when the monitored value of the engine load exceeds a first threshold value of the engine load. Another embodiment provides that the control parameter is an engine speed, and a step of switching from the closed loop procedure to the open loop procedure is performed when the monitored value of the engine speed exceeds a first threshold value of the engine speed. Each of these two embodiments has the advantage of reducing the DEF consumption when the Diesel engine is working at high load, for example when a vehicle equipped with this Diesel engine is pulling a trailer in full load.

According to another embodiment, the control parameter is the environmental pressure, and a step of switching from the closed loop procedure to the open loop procedure is performed when the monitored value of the environmental pressure falls below a first threshold value of the environmental pressure. This embodiment has the advantage of reducing the DEF consumption when the Diesel engine operates at high altitude.

According to an embodiment of the invention, the method comprises the further steps of disabling the injection of the DEF, when the monitored value of the control parameter crosses a second threshold value associated thereto. Also in this case, the injection of the DEF can be disabled when the monitored value of the control parameter exceeds its second threshold or when the monitored value of the control parameter decreases below its second threshold, depending on the specific control parameter.

The second threshold value can also be an extreme values of a range of values, so that the injection of the DEF can be disabled when the control parameter go outside said range of values. By a proper calibration of the second threshold value, the above mentioned embodiment can achieve the advantage of saving DEF for example when the NOx conversion inside the SCR is almost ineffective, such as for example when the exhaust gas temperature upstream the SCR is extremely high. As a matter of fact, the exhaust gas temperature upstream the SCR is in inverse relation with the $NH_3$ storage capacity of the SCR, which is strictly correlated to the NOx conversion efficiency. As a consequence, when the exhaust gas temperature upstream the SCR is extremely high, the NOx conversion efficiency within the SCR may decrease to the point that almost all the NOx content of the exhaust gas is anyway discharged into the environment. In cases like this, it could be advisable to disable the DEF injection, in order to save DEF.

According to another embodiment, the controlling method comprises the further step of disabling the injection of DEF for a period preceding a regeneration phase of a DPF. As a matter of fact, the regeneration phase of the DPF increases the temperature of the exhaust gas upstream the SCR, thereby drastically reducing the $NH_3$ storage capacity of the SCR. The difference between the $NH_3$ storage capacity of the SCR during the DPF regeneration phase, and the $NH_3$ storage level of the SCR before the beginning of the DPF regeneration phase, represents an exceeding amount of $NH_3$ that is usually lost without producing any NOx conversion effect.

By disabling the DEF injection, this exceeding amount of $NH_3$ can be effectively used for the NOx conversion before the beginning of the DPF regeneration phase, while the $NH_3$ storage level of the SCR is reduced beneath the $NH_3$ storage capacity that the SCR will have during the DPF regeneration phase.

The method according to any embodiment can be carried out with the help of a computer program comprising a program-code for carrying out all the steps of the method described above, and in the form of a computer program product comprising the computer program. The computer program product can be embodied as an internal combustion engine equipped with an exhaust pipe, a SCR located in the exhaust pipe, a DEF injector located in the exhaust pipe upstream the SCR, an ECU, a data carrier associated to the ECU, and the computer program stored in the data carrier, so that, when the ECU executes the computer program, all the steps of the method described above are carried out. The method can be embodied as an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
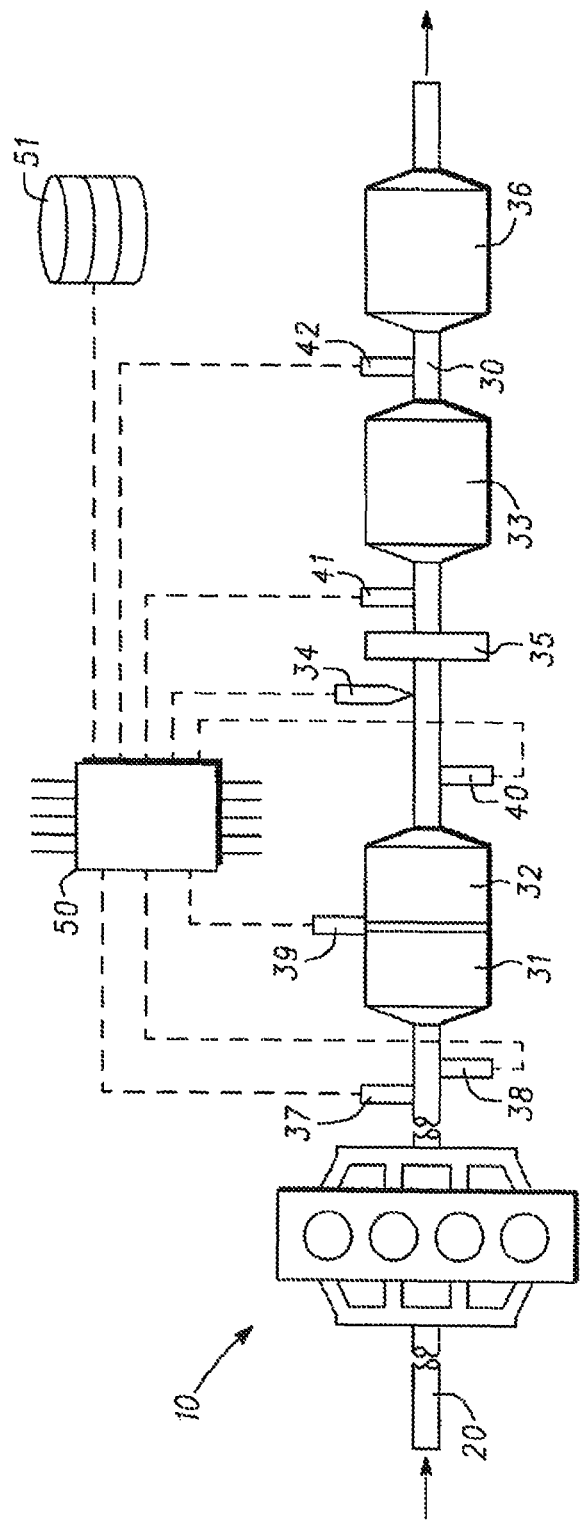
FIG. 1 is a schematic representation of a Diesel engine.

The following detailed description is merely exemplary in nature and is not intended to limit application and uses. Furthermore, there is no intention to be bound by any theory presented in the preceding background or summary or the following detailed description.

An embodiment of the invention is hereinafter disclosed with reference to an internal combustion engine 10 of a motor vehicle, more particularly a Diesel engine. The engine 10 is conventionally equipped with an intake pipe 20 for feeding fresh air into the engine cylinders, with an exhaust pipe 30 for discharging exhaust gas from the engine cylinders into the environment, and with a plurality of aftertreatment devices, which are located in the exhaust pipe 30, in order to degrade and/or remove pollutants from the exhaust gas before discharging it in the environment.

In greater details, the exhaust pipe 30 is provided with a Diesel Oxidation Catalyst (DOC) 31, for oxidizing hydrocarbon (HC) and carbon monoxides (CO) into carbon dioxide ($CO_2$) and water ($H_2O$); with a Diesel Particulate Filter (DPF) 32, which is located downstream the DOC 31, for removing diesel particulate matter or soot from the exhaust gas; and furthermore with a Selective Reduction Catalyst (SCR) 33, located downstream the DPF 32, for converting the nitrogen oxides (NOx) contained in the exhaust gas into diatonic nitrogen (N2) and water (H2O).

The SCR 33 is associated with a DEF injector 34, which is located in the exhaust pipe 30 between the DPF 32 and the SCR 33, for injecting a Diesel Exhaust Fluid (DEF), typically urea ($CH_4N_2O$), in the exhaust gas stream. Due to thermo-hydrolysis reactions occurring inside the exhaust pipe 30, the DEF is converted into a gaseous reducing agent, typically ammonia ($NH_3$), which is stored inside the SCR 33 so as to promote the NOx conversion reactions. A mixer 35 is located in the exhaust pipe 30 between the DEF injector 34 and the SCR 33, in order to improve the mixing of the DEF in the exhaust gas, and a conventional muffler 36 is located downstream the SCR 33.

The engine 10 is associated to a control system that comprises an Engine Control Unit (ECU) 50 and a plurality of sensors connected to the ECU 50. Several of these sensors are located in the exhaust pipe 30, including a Universal Exhaust Gas Oxygen (UEGO) sensor 37 for measuring the oxygen (O2) concentration in the exhaust gas at the DOC inlet; a temperature sensor 38 for measuring the exhaust gas temperature at the DOC inlet; another temperature sensor 39 for measuring the exhaust gas temperature at the DPF inlet; a NOx sensor 40 for measuring the NOx concentration in the exhaust gas downstream the DPF 32 and upstream the DEF injector 34; a further temperature sensor 41 for measuring the exhaust gas temperature at the SCR inlet; and another NOx sensor 42 for measuring the NOx concentration downstream the SCR 33 and upstream the muffler 36.

The ECU 50 is generally provided for controlling the operation of the engine 10 as well as of the aftertreatment devices 31-33, by executing dedicated computer programs which are stored in a data carrier 51. In particular, the ECU 50 is provided for controlling the injection of DEF into the exhaust pipe 30, by means of the general steps of determining the quantity of DEF to be injected and of commanding the DEF injector 34 accordingly.

Figure 2:
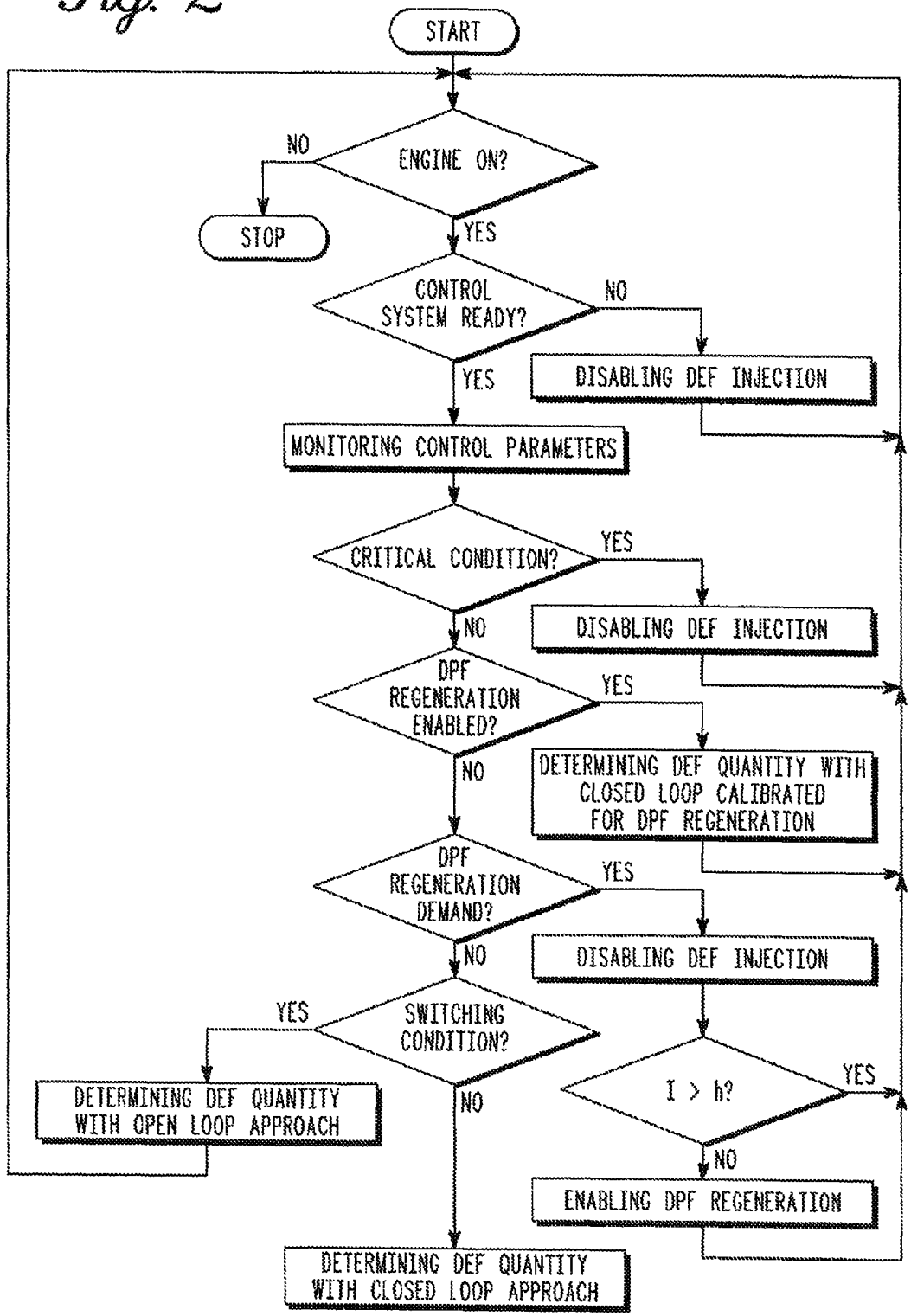
FIG. 2 is a flowchart representing a controlling method according to an embodiment.

An embodiment provides an improved method for controlling the injection of DEF. As shown in FIG. 2, this method firstly provides for evaluating whether the engine 10 is on or off. While the engine 10 is on, the method provides for checking whether the above mentioned control system of the engine 10 is ready or not. The control system is not ready for example when the computer program involved is not properly loaded, or when a fault occurs in the ECU 50 or in any of the sensors connected thereto. If the control system is not ready, the method provides for disabling the DEF injection, namely for closing the DEF injector 34 so that no DEF is injected into the exhaust pipe 30. The DEF injection is kept disabled until the control system becomes ready.

As long as the engine 10 is on and the control system is ready, the method provides for monitoring one or more control parameters influencing the operation of the SCR 33, whereby this operation can be defined for example in term of the NOx conversion efficiency of the SCR 33 or in term of the DEF consumption.

These control parameters can comprise operating parameters related to the operation of the engine 10, such as for example engine speed, engine load, exhaust gas flow rate upstream the SCR 33, exhaust gas temperature upstream the SCR, NOx concentration upstream the SCR 33 and engine coolant temperature. The control parameter can also comprise environmental parameters related to the environmental conditions under which the engine 10 operates, such as for example environmental pressure and environmental temperature.

The value of the above mentioned control parameters can be either estimated by the ECU 50 or measured through dedicated sensors, such as for example the temperature sensor 41 that measures the exhaust gas temperature upstream the SCR 33 and the NOx sensor 40 that measures NOx concentration upstream the SCR 33.

The method then provides for evaluating if the SCR 33 operates under a critical condition. In order to evaluate whether the condition is critical or not, the method provides for setting a discriminating rule for each of the above mentioned control parameters, and for assessing that the condition is critical when at least one of these discriminating rules is fulfilled As a matter of fact, a discriminating rule can be defined by assigning to the related control parameter a critical threshold value, above which the SCR 33 is for example considered ineffective, and by establishing that the discriminating rule is fulfilled only when the actual value of the control parameter exceeds this critical threshold value. Alternatively, a discriminating rule can be defined by assigning to the related control parameter an admissible range of values, outside of which the SCR 33 is for example considered ineffective, and by establishing that the discriminating rule is fulfilled only when the actual value of the control parameter falls outside this admissible range of values.

The chose of the discriminating rule depends on the specific control parameter. If the condition is critical, the method provides for disabling the DEF injection. The DEF injection is kept disabled until the condition is no more critical, that is until the above mentioned discriminating rules are fulfilled. While the control system is ready and the SCR 33 operates under not critical condition, the method provides for evaluating whether a regeneration phase of the DPF 32 is currently enabled or not.

The DPF regeneration phase is governed by the ECU 50 and provides for the engine 10 to perform a special combustion mode, through which a certain amount of fuel is discharged unburned from the engine cylinders to the exhaust pipe 30. This unburned fuel burns inside the DOC 31, thereby producing hot exhaust gas that heats the DPF 32. As the temperature of the DPF 32 reaches about 600° C.-700° C., the soot matter trapped inside the DPF 32 is burned off. However, the high temperature of the exhaust gas during the DPF regeneration phase strongly reduces the $NH_3$ storage capacity of the SCR 33. This drawback is taken into account by the controlling method, as it will be explained later in the description.

If no DPF regeneration phase is currently enabled, the method provides for checking whether a DPF regeneration demand has been generated and is currently active. The DPF regeneration demand is generated by the ECU 50, according to a dedicated DPF controlling strategy, when the soot loading level inside the DPF 32 exceeds a predetermined threshold. Following a DPF regeneration demand, the controlling method of the DEF injection provides for the ECU 50 to enable the DPF regeneration phase only if a certain condition is fulfilled, as it will be explained later in the description. While neither DPF regeneration phase nor DPF regeneration demand is currently active, the method provides for evaluating whether a predetermined switching condition is satisfied or not.

In order to evaluate whether the switching condition is satisfied or not, the method provides for setting a further discriminating rule for each of the above mentioned control parameters, and for assessing that the switching condition is satisfied when at least one of these further discriminating rules is fulfilled. As in the preceding case, a discriminating rule can be defined by assigning to the related control parameter a threshold value, and by establishing that the discriminating rule is fulfilled only when the actual value of the control parameter exceeds this threshold value. Alternatively, a discriminating rule can be defined by assigning to the related control parameter an admissible range of values, and by establishing that the discriminating rule is not fulfilled only when the actual value of the control parameter falls outside this admissible range of values.

The chose of the discriminating rule depends on the specific control parameter. By way of example, the switching condition is satisfied when at least one of the discriminating rules disclosed hereinafter is fulfilled. The actual value of the exhaust gas flow rate upstream the SCR 33 exceeds a threshold value associated thereto, in particular a threshold value chosen in a range comprised between approximately 1300 kg/h and approximately 1600 kg/h, for example a threshold value of approximately 1440 kg/h. The exhaust gas temperature upstream the SCR 33 exceeds a threshold value associated thereto, in particular a threshold value chosen in a range comprised between approximately 500° C. and approximately 600° C., for example a threshold value of approximately 550° C.

The quantity of NOx in the exhaust gas upstream the SCR 33 exceeds a threshold value associated thereto. The threshold value of the NOx quantity can be expressed in term of a NOx flow rate or in term of a NOx concentration. In the first case, the threshold value of the NOx quantity can be chosen in a range comprised between approximately 225 mg/s and approximately 275 mg/s, for example a threshold value of approximately 250 mg/s. In the second case the threshold value of the NOx quantity can be chosen in a range comprised between approximately 1350 ppm and approximately 1650 ppm, for example a threshold value of approximately 1500 ppm.

The engine coolant temperature exceeds a threshold value associated thereto, in particular a threshold value chosen in a range comprised between approximately 100° C. and approximately 120° C., for example a threshold value of approximately 108° C. The environmental pressure falls below a threshold value associated thereto, in particular a threshold value chosen in a range comprised between approximately 670 hPa and approximately 810 hPa, for example a threshold value of approximately 740 hPa, which generally corresponds to an altitude of about approximately 2500 m above the sea level.

The engine speed exceeds a threshold value associated thereto, in particular a threshold value chosen in a range comprised between approximately 2160 rpm and approximately 2640 rpm, for example a threshold value of approximately 2400 rpm. The engine load exceeds a threshold value associated thereto, in particular a threshold value chosen in a range comprised between approximately 54 $mm^3$ per engine cycle and approximately 66 $mm^3$ per engine cycle, for example a threshold value of approximately 60 $mm^3$ per engine cycle.

As long as all the above mentioned switching conditions are not fulfilled, the method provides for controlling the DEF quantity to be injected into the exhaust pipe 30, according to a closed loop procedure. Conversely, when at least one of the above mentioned switching conditions is fulfilled, the method provides for controlling the DEF quantity to be injected, according to an open loop procedure. The closed loop procedure is focused on the control of the level of $NH_3$ stored inside the SCR 33.

Figure 3:
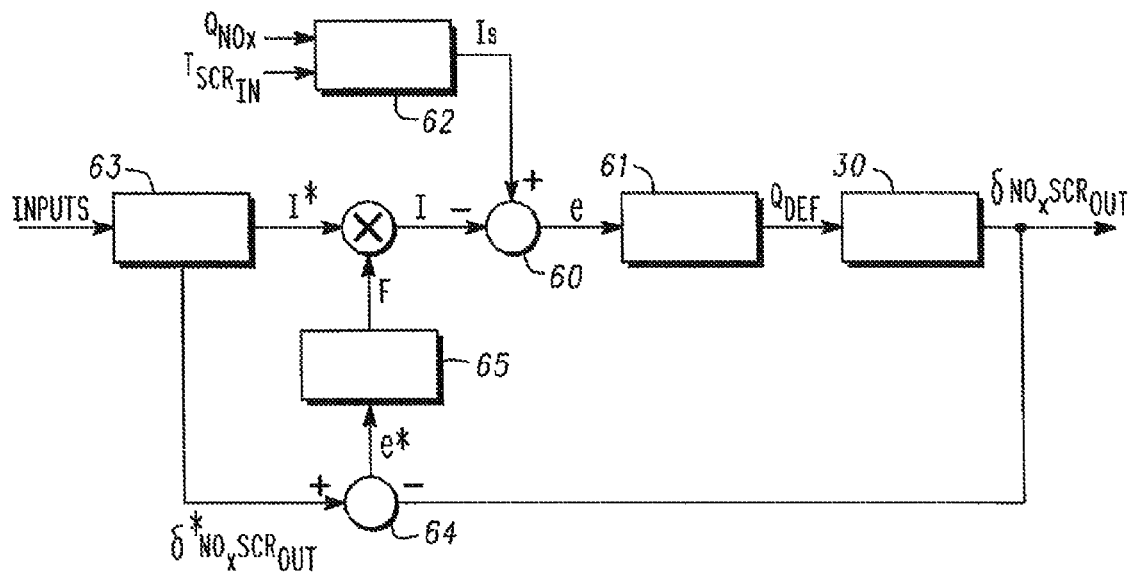
FIG. 3 is a flowchart representing a closed loop procedure for determining a DEF quantity to be injected into the exhaust pipe of the Diesel engine of FIG. 1.

As shown in FIG. 3, this closed loop procedure provides for determining the value I of an index expressive of the $NH_3$ storage level and a setpoint value Is of said index. An adder 60 calculates the difference e between the index value I and the setpoint value Is. The difference e is sent to a proportional controller 61, which is provided for regulating the DEF quantity QDEF to be injected into the exhaust pipe 30, in order to minimize said difference.

The set point value is determined by means of a map 62 correlating the setpoint value is to the NOx mass flow QNOx at the SCR inlet and to one or more parameters influencing the NOx conversion efficiency of the SCR 33, including for example the exhaust gas temperature TSCRin at the SCR inlet. The NOx mass flow QNOx can be calculated by multiplying the exhaust gas mass flow upstream the SCR 33 by the NOx concentration measured by the NOx sensor 40. The other parameters can be either estimated by the ECU 50 or measured through dedicated sensors, such as for example the temperature sensor 41 that measures the exhaust gas temperature TSCRin at the SCR inlet. The index value I is determined by means of a mathematical model 63 of the SCR 33, which estimates a rough value I* of the index as a function of a plurality of inputs. These inputs comprise a plurality of operating parameters and environmental parameters, which influence the $NH_3$ storage level inside the SCR 33.

The operating parameters can comprise: exhaust gas mass flow upstream the SCR 33; DEF mass flow at the SCR inlet; Oxygen concentration in the exhaust gas upstream the SCR 33; NOx concentration in the exhaust gas upstream the SCR 33; $NO_2$ to NOx ratio in the SCR inlet; exhaust gas temperature at the SCR inlet; exhaust gas pressure upstream the SCR 33; exhaust gas pressure downstream the SCR 33; and vehicle speed. The environmental parameters can comprise environmental temperature and environmental pressure.

The above mentioned parameters can be either estimated by the ECU 50 or measured through dedicated sensors, such as for example the NOx sensor 40 that measures the NOx concentration in the exhaust gas upstream the SCR 33 and the temperature sensor 41 that measures the exhaust gas temperature at the SCR inlet. The rough value I* is then multiplied by a correction factor F in order to calculate the index value I. The correction factor F is determined by means of a closed loop control of the NOx concentration in the exhaust gas downstream the SCR 33, which is caused by the injection of the calculated DEF quantity QDEF into the exhaust pipe 30.

The value $\delta NOx,SCRout$ of the NOx concentration is measured by the NOx sensor 42 and is sent to an adder 64 that calculates the difference e* between the sensed value $\delta NOx$, SCRout and an expected value δ*NOx,SCRout of said NOx concentration. The expected value δ*NOx,SCRout is estimated by means of the same mathematical model 63 of the SCR 33 used for estimating the rough value I*. The difference e* is sent to a map 65 correlating the difference e* to the correction factor F to be applied to the rough value I*, in order to calculate the index value I. Thanks to this closed loop mechanism, the estimated index value I is highly reliable, allowing an effective determination of the DEF quantity QDEF to be injected.

Figure 4:
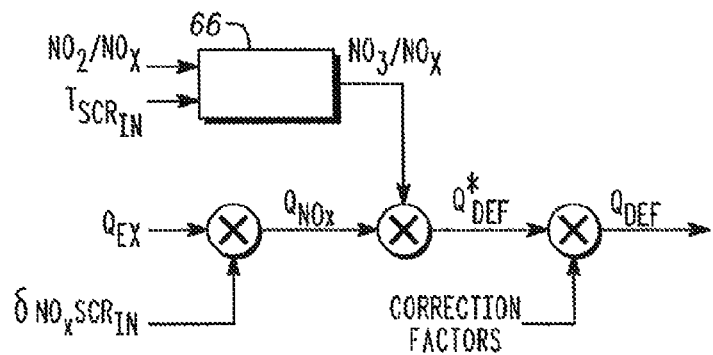
FIG. 4 is a flowchart representing an open loop procedure for determining a DEF quantity to be injected into the exhaust pipe of the Diesel engine of FIG. 1.

As shown in FIG. 4, the open loop procedure for controlling the DEF quantity to be injected provides for calculating the NOx mass flow QNOx at the SCR inlet, by multiplying the exhaust gas mass flow QEX upstream the SCR 33 by the NOx concentration δNOx,SCRin in the exhaust gas flowing upstream the SCR 33, which can be measured through the NOx sensor 40 The NOx mass flow QNOx is then multiplied by a required value of the ammonia to NOx ratio, indicated as $NH_3/NOx$, in order to calculate a rough value Q*DEF of the DEF quantity to be injected into the exhaust pipe 30. The required value $NH_3/NOx$ is determined trough a map 66 correlating the required value $NH_3/NOx$ to a plurality of parameters influencing the NOx conversion efficiency of the SCR 33, including for example the $NO_2$ to NOx ratio at the SCR inlet, indicated as $NO_2/NOx$, and the exhaust gas temperature TSCRin at the SCR inlet.

The rough value Q*DEF in subsequently multiplied by a plurality of Correction Factors, in order to calculate the effective quantity of DEF QDEF to be injected. These Correction Factors are determined on the basis of a plurality of parameters influencing the NOx conversion efficiency of the SCR 33, including operating parameters, such as for example the exhaust gas mass flow, engine speed, engine load and engine coolant temperature, and environmental parameters, such as for example environmental pressure and environmental temperature.

While the previously described closed loop procedure generally gets an optimal NOx efficiency of the SCR 33 but can cause an excessive DEF consumption, the open loop procedure generally gets an optimal DEF consumption in almost all operating and environmental conditions but can reduce the NOx efficiency of the SCR 33. As a consequence, the threshold values that define the above mentioned switching condition are chosen so as to define a bound between the DEF consumption and the NOx efficiency of the SCR 33: when the switching condition is satisfied, the open loop procedure is advisable, because the closed loop procedure could cause an unacceptable DEF consumption; when the switching condition is not satisfied, the closed loop procedure is advisable because the open loop procedure could cause an unacceptably low NOx conversion efficiency of the SCR 33.

As shown in FIG. 2, when a DPF regeneration demand is generated, the method provides for completely disabling the injection of DEF into the exhaust pipe 30. By disabling the DEF injection before the beginning of the DPF regeneration phase, the $NH_3$ storage level inside the SCR is progressively reduced. The DEF injection is kept disabled until the $NH_3$ storage level falls below the $NH_3$ storage capacity that the SCR 33 will have during the DPF regeneration phase. In greater details, while the DEF injection is disabled, the method provides for determining the value I of the index expressive of the $NH_3$ storage level inside the SCR 33.

As long as the index value I exceeds an associated threshold value It, expressive of the $NH_3$ storage capacity of the SCR 33 during a regeneration phase of the DPF 32, the method provides for keeping the DEF injection disabled.

When the index value I falls below the threshold value It, the method provides for the ECU 50 to enable the regeneration phase of the DPF 32.

While a DPF regeneration phase is enabled, the method provides for enabling the injection of DEF inside the exhaust pipe 30, and for performing a control process that controls the DEF quantity to be injected according to a closed loop procedure. This closed loop procedure is the same described above but it is calibrated for the DPF regeneration phase. As a matter of fact, the map 62 shown in FIG. 3 is replaced by another map which provides a setpoint value Is that takes into account the effects of the DPF regeneration phase. Obviously, the entire controlling method ends when the engine 10 is turned off.

According to an embodiment, each embodiment of the controlling method described above can be performed with the help of a computer program comprising a program-code for carrying out all the steps of the method, which is stored in the data carrier 51 associated to the ECU 50. In this way, when the ECU 50 executes the computer program, all the steps of the method described above are carried out.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A method for controlling injection of Diesel Exhaust Fluid into an exhaust pipe of an internal combustion engine equipped with a Selective Reduction Catalyst, comprising:
   monitoring a value of a control parameter influencing an operation of the Selective Reduction Catalyst;
   injecting a quantity of Diesel Exhaust Fluid;
   controlling the quantity of Diesel Exhaust Fluid injected with a closed loop procedure when the value of the control parameter is below a first threshold value; and
   controlling the quantity of Diesel Exhaust Fluid injected with an open loop procedure when the value of the control parameter is above the first threshold value,
   wherein the control parameter is an exhaust gas flow rate upstream the Selective Reduction catalyst, and
   wherein the switching from the closed loop procedure to the open loop procedure is performed when the value of the exhaust gas flow rate exceeds a first threshold value of the exhaust gas flow rate.

2. The method according to claim 1, wherein the control parameter is an operating parameter related to an operation of the internal combustion engine.

3. The method according to claim 1, wherein the control parameter is an operating parameter related to an environmental parameter related to an environmental condition under which the internal combustion engine operates.

4. The method according to claim 1,
   wherein the control parameter is an exhaust gas temperature upstream the Selective Reduction Catalyst, and
   wherein the switching from the closed loop procedure to the open loop procedure is performed when the value of the exhaust gas temperature exceeds a first threshold value of the exhaust gas temperature.

5. The method according to claim 1,
wherein the control parameter is a quantity of NOx in an exhaust gas upstream the Selective Reduction Catalyst, and
wherein a step of switching from the closed loop procedure to the open loop procedure is performed when the value of this NOx quantity exceeds a first threshold value of this NOx quantity.

6. The method according to claim 1,
wherein the control parameter is an engine coolant temperature, and
wherein the switching from the closed loop procedure to the open loop procedure is performed when the value of the engine coolant temperature exceeds a first threshold value of the engine coolant temperature.

7. The method according to claim 1,
wherein the control parameter is an engine load, and
wherein the switching from the closed loop procedure to the open loop procedure is performed when the value of the engine load exceeds a first threshold value of the engine load.

8. The method according to claim 1,
wherein the control parameter is an engine speed, and
wherein the switching from the closed loop procedure to the open loop procedure is performed when the value of the engine speed exceeds a first threshold value of the engine speed.

9. The method according to claim 1,
wherein the control parameter is an environmental pressure, and
wherein the switching from the closed loop procedure to the open loop procedure is performed when the value of the environmental pressure falls below a first threshold value of the environmental pressure.

10. The method according to claim 1, further comprising disabling the injection of DEF when the control parameter crosses a second threshold value.

11. The method according to claim 1, further comprising disabling the injection of DEF for a period preceding a regeneration phase of a DPF.

12. A computer readable medium embodying a computer program product, said computer program product comprising:
a control program for controlling injection of Diesel Exhaust Fluid into an exhaust pipe of an internal combustion engine equipped with a Selective Reduction Catalyst, the control program configured to:
monitor a value of a control parameter influencing an operation of the Selective Reduction Catalyst;
inject a quantity of Diesel Exhaust Fluid;
control the quantity of Diesel Exhaust Fluid injected with a closed loop procedure when the value of the control parameter is below a first threshold value; and
control the quantity of Diesel Exhaust Fluid injected with a closed loop procedure an open loop procedure when the value of the control parameter is above the first threshold value,
wherein the control parameter is an exhaust gas flow rate upstream the Selective Reduction catalyst, and
wherein the switching from the closed loop procedure to the open loop procedure is performed when the value of the exhaust gas flow rate exceeds a first threshold value of the exhaust gas flow rate.

13. The computer readable medium embodying the computer program product according to claim 12, wherein the control parameter is an operating parameter related to an operation of the internal combustion engine.

14. The computer readable medium embodying the computer program product according to claim 12, wherein the control parameter is an operating parameter related to an environmental parameter related to an environmental condition under which the internal combustion engine operates.

15. The computer readable medium embodying the computer program product according to claim 12,
wherein the control parameter is an exhaust gas temperature upstream the Selective Reduction Catalyst, and
wherein the switching from the closed loop procedure to the open loop procedure is performed when the value of the exhaust gas temperature exceeds a first threshold value of the exhaust gas temperature.

16. The computer readable medium embodying the computer program product according to claim 12,
wherein the control parameter is a quantity of NOx in an exhaust gas upstream the Selective Reduction Catalyst, and
wherein a step of switching from the closed loop procedure to the open loop procedure is performed when the value of this NOx quantity exceeds a first threshold value of this NOx quantity.

17. The computer readable medium embodying the computer program product according to claim 12,
wherein the control parameter is an engine coolant temperature, and
wherein the switching from the closed loop procedure to the open loop procedure is performed when the value of the engine coolant temperature exceeds a first threshold value of the engine coolant temperature.

18. The computer readable medium embodying the computer program product according to claim 12,
wherein the control parameter is an engine load, and
wherein the switching from the closed loop procedure to the open loop procedure is performed when the value of the engine load exceeds a first threshold value of the engine load.

19. The computer readable medium embodying the computer program product according to claim 12,
wherein the control parameter is an engine speed, and
wherein the switching from the closed loop procedure to the open loop procedure is performed when the value of the engine speed exceeds a first threshold value of the engine speed.

20. The computer readable medium embodying the computer program product according to claim 12,
wherein the control parameter is an environmental pressure, and
wherein the switching from the closed loop procedure to the open loop procedure is performed when the value of the environmental pressure falls below a first threshold value of the environmental pressure.

21. The computer readable medium embodying the computer program product according to claim 12, the control program further configured to disable the injection of DEF when the control parameter crosses a second threshold value.

22. The computer readable medium embodying the computer program product according to claim 12, the control program further configured to disable the injection of DEF for a period preceding a regeneration phase of a DPF.

23. An internal combustion engine, comprising:
an exhaust pipe;
a SCR located in the exhaust pipe;
a DEF injector located in the exhaust pipe upstream the SCR; and
an ECU configured to:

monitor a value of a control parameter influencing an operation of the SCR;
inject a quantity of Diesel Exhaust Fluid;
control the quantity of Diesel Exhaust Fluid injected with a closed loop procedure when the value of the control parameter is below a first threshold value; and
control the quantity of Diesel Exhaust Fluid injected with an open loop procedure when the value of the control parameter is above the first threshold value,
wherein the control parameter is an exhaust gas flow rate upstream the SCR, and
wherein the switching from the closed loop procedure to the open loop procedure is performed when the value of the exhaust gas flow rate exceeds a first threshold value of the exhaust gas flow rate.

24. The internal combustion engine according to claim 23, wherein the control parameter is an operating parameter related to an operation of the internal combustion engine.

25. The internal combustion engine according to claim 23, wherein the control parameter is an operating parameter related to an environmental parameter related to an environmental condition under which the internal combustion engine operates.

26. The internal combustion engine according to claim 23,
wherein the control parameter is an exhaust gas temperature upstream the SCR, and
wherein the switching from the closed loop procedure to the open loop procedure is performed when the value of the exhaust gas temperature exceeds a first threshold value of the exhaust gas temperature.

27. The internal combustion engine according to claim 23,
wherein the control parameter is a quantity of NOx in an exhaust gas upstream the SCR, and
wherein a step of switching from the closed loop procedure to the open loop procedure is performed when the value of this NOx quantity exceeds a first threshold value of this NOx quantity.

28. The internal combustion engine according to claim 23,
wherein the control parameter is an engine coolant temperature, and
wherein the switching from the closed loop procedure to the open loop procedure is performed when the value of the engine coolant temperature exceeds a first threshold value of the engine coolant temperature.

29. The internal combustion engine according to claim 23,
wherein the control parameter is an engine load, and
wherein the switching from the closed loop procedure to the open loop procedure is performed when the value of the engine load exceeds a first threshold value of the engine load.

30. The internal combustion engine according to claim 23,
wherein the control parameter is an engine speed, and
wherein the switching from the closed loop procedure to the open loop procedure is performed when the value of the engine speed exceeds a first threshold value of the engine speed.

31. The internal combustion engine according to claim 23,
wherein the control parameter is an environmental pressure, and
wherein the switching from the closed loop procedure to the open loop procedure is performed when the value of the environmental pressure falls below a first threshold value of the environmental pressure.

32. The internal combustion engine according to claim 23, the ECU is further configured to disable the injection of DEF when the control parameter crosses a second threshold value.

33. The internal combustion engine according to claim 23, the ECU is further configured to disable the injection of DEF for a period preceding a regeneration phase of a DPF.

* * * * *